Nov. 24, 1964    F. T. MURPHY    3,158,246
VENDING MACHINE

Filed Feb. 28, 1962    8 Sheets-Sheet 1

INVENTOR.
FRANCIS T. MURPHY
BY
Ooms, McDougall and Hersh
ATT'YS.

Nov. 24, 1964  F. T. MURPHY  3,158,246
VENDING MACHINE
Filed Feb. 28, 1962  8 Sheets-Sheet 6
FIG. 8
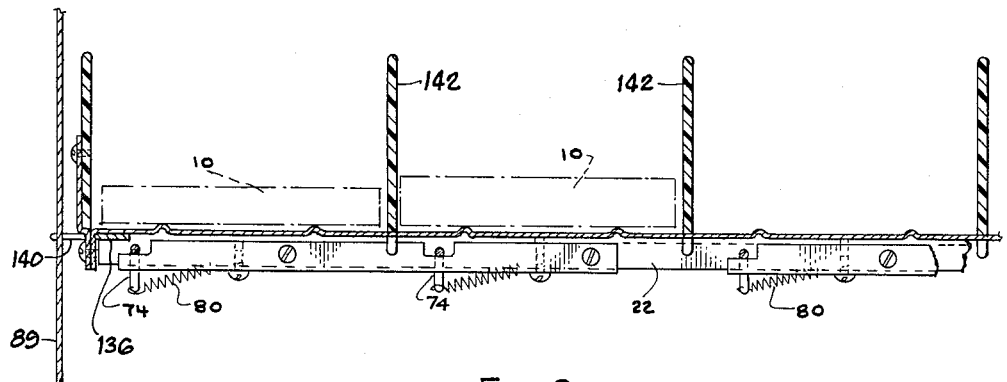
FIG. 9
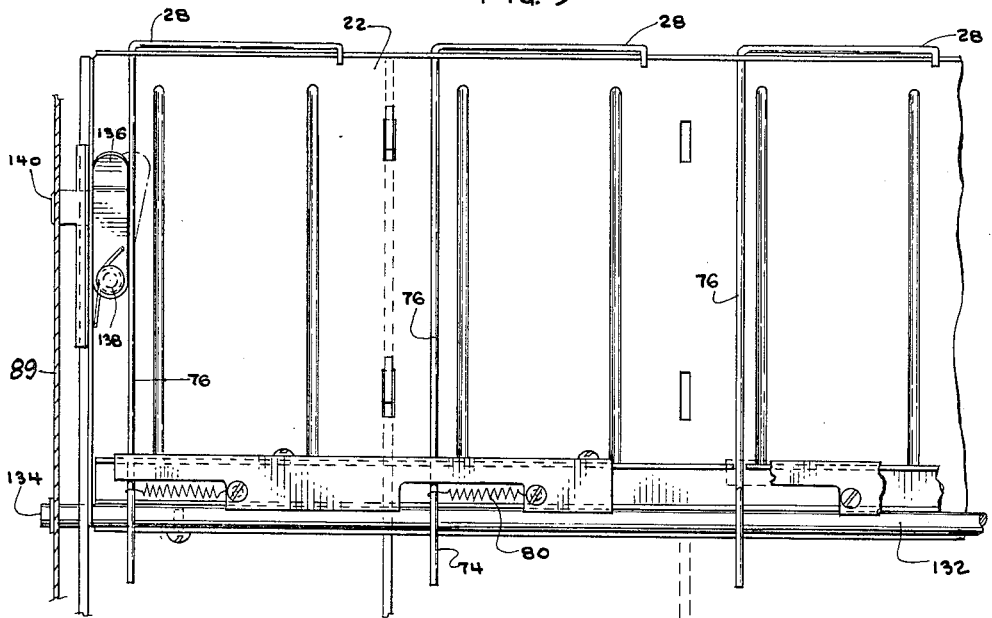
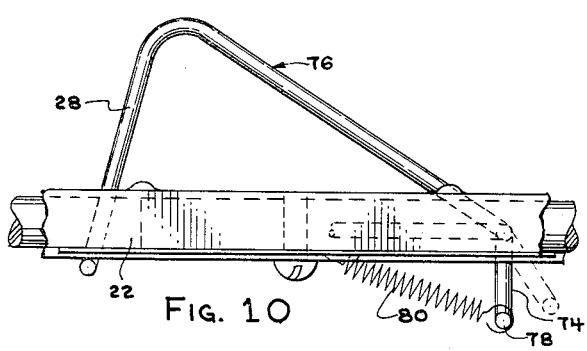
FIG. 10
INVENTOR.
FRANCIS T. MURPHY
BY
Ooms, McDougall and Hersh
ATT'YS.

Nov. 24, 1964  F. T. MURPHY  3,158,246
VENDING MACHINE
Filed Feb. 28, 1962  8 Sheets-Sheet 7

INVENTOR.
FRANCIS T. MURPHY
BY
Ooms, McDougall and Hersh
ATT'YS.

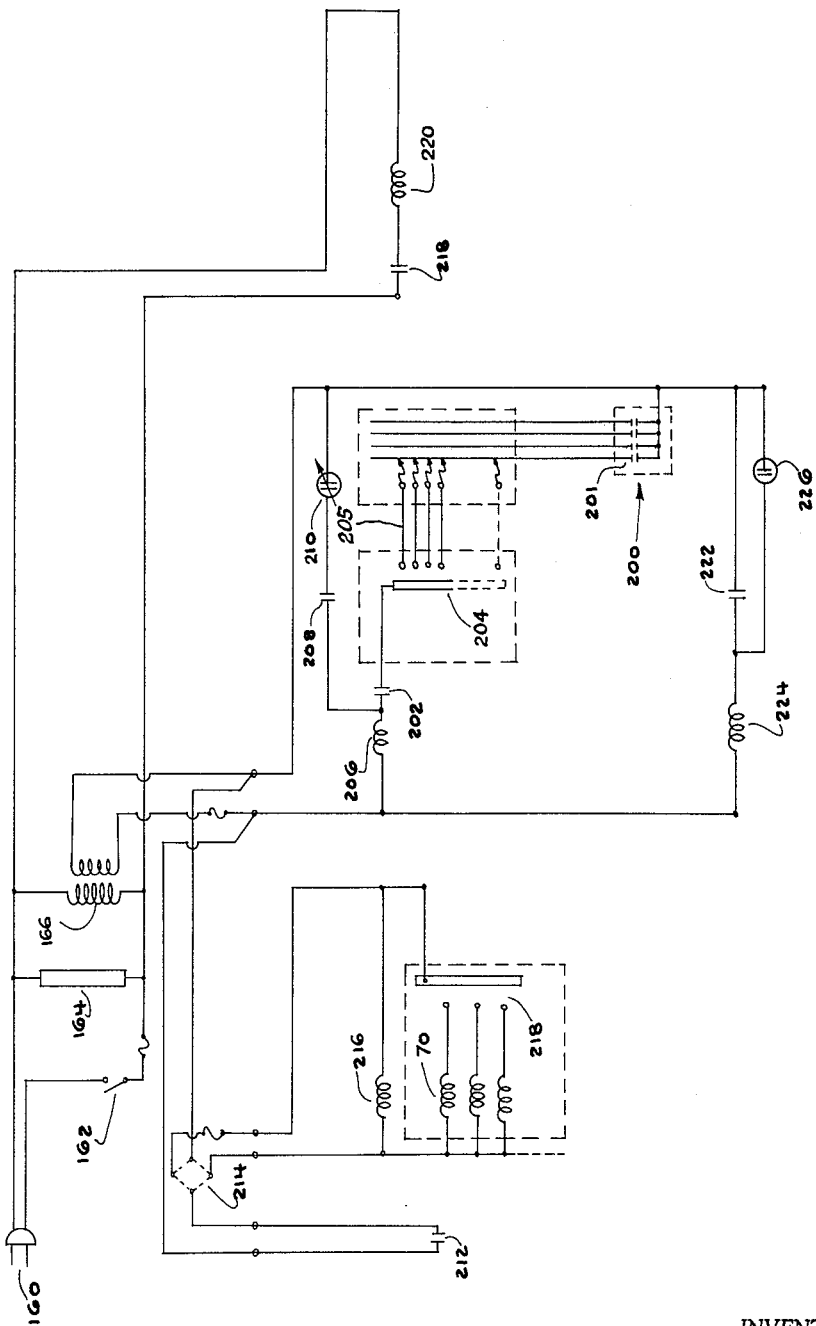

United States Patent Office

3,158,246
Patented Nov. 24, 1964

3,158,246
VENDING MACHINE
Francis T. Murphy, Chicago, Ill., assignor, by mesne assignments, to Rock-Ola Manufacturing Corporation, Chicago, Ill., a corporation of Delaware
Filed Feb. 28, 1962, Ser. No. 176,273
16 Claims. (Cl. 194—2)

This invention relates to an improved vending machine construction which is suitable for use in connection with various articles. The machine of this invention is particularly designed for handling large numbers and varieties of relatively large articles. The machine is adapted to permit rapid and efficient vending of these articles and can be operated without danger of loss of goods or revenue by reason of pilfering.

It is one object of this invention to provide a vending machine construction which is particularly suitable for use in applications which require handling of relatively large numbers and varieties of articles.

It is an additional object of this invention to provide a vending machine construction which operates in a highly rapid, dependable and efficient manner.

These and other objects of this invention will appear hereinafter and, for purposes of illustration, but not of limitation, specific embodiments of this invention are shown in the accompanying drawings in which—

FIGURE 8 is a fragmentary sectional elevation of the machine article delivery means, this view being taken about the line 8—8 of FIGURE 5;

FIGURE 9 is a fragmentary bottom view of the delivery means shown in FIGURE 8;

FIGURE 10 is a detail fragmentary view taken about the line 10—10 of FIGURE 5;

FIGURE 16 is a diagrammatic illustration of a suitable circuit for use in the vending machine.

*General Operation*

The general description, as well as the detailed description to follow, will be made with reference to a book vending machine which is adapted to vend the books 10 shown in the accompanying drawings. Although the particular machine illustrated is particularly suitable for the handling of books, such as paperback books, it will be understood that the concepts of this invention can be employed in providing vending machines for a wide variety of articles.

Figure 1:
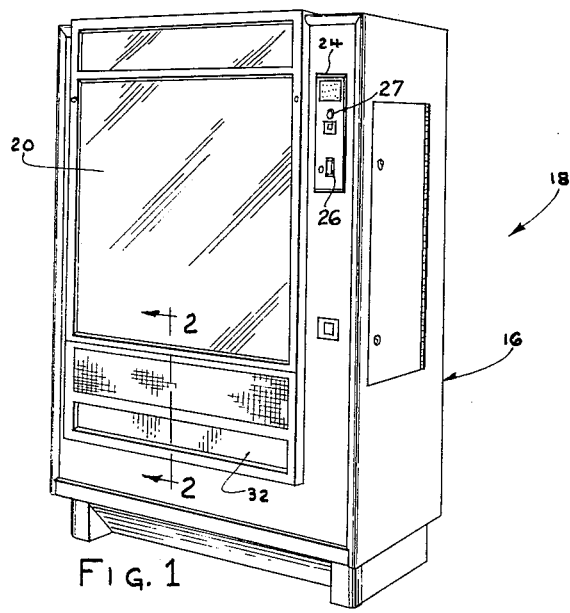
FIGURE 1 is a perspective view of a vending machine characterized by the features of this invention.
Figure 2:
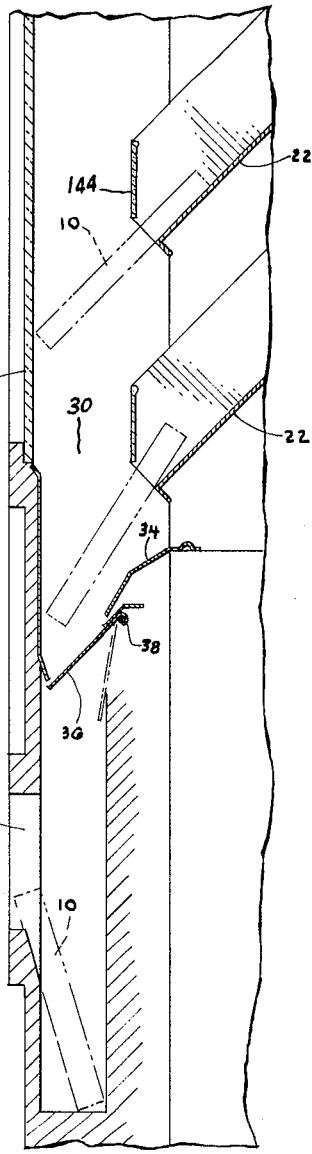
FIGURE 2 is a fragmentary sectional elevation illustrating details of the vending chute, the view being taken along the line 2—2 of FIGURE 1.

In the machine illustrated, the books 10 are located in individual shelf compartments 12, these compartments including bottom portions 13 and upstanding walls 14. The shelf compartments are located in a plurality of tiers 15 within the housing 16 of the machine 18, illustrated in FIGURE 1. As shown particularly in FIGURE 7, several books can be stacked in a given shelf compartment and the shelves are arranged in side-by-side relationship in a given tier. It will be appreciated, particularly after considering the following description, that the number of tiers, the number of shelves in a tier and the number of books on a shelf will be limited only by available space and by similar practical factors.

An individual interested in purchasing a book can view the several covers through the transparent front 20. The arrangement of this invention permits viewing of the covers, since one book is located in each of the several inclined delivery trays 22. One of these trays is provided for each shelf location and if the books for a given location are sold out, the tray 22 for that location will be empty.

A selector 24 is provided on the front of the machine whereby an individual can automatically select the book desired. The individual can then insert a coin in the slot 26 and operate tne pushbutton 27. The combination of these actions operates the vend mechanism which includes movement of the retainer member 28 at the end of the tray 22. Only one retainer member moves, depending on the book selected, and this book will slide down the chute 30 and into the opening 32 where the purchaser can remove it.

A stationary deflector 34 is provided to prevent jamming of books above the opening 32. A swinging gate 36 is provided with resilient hinge means 38 and is forced to the dotted line position shown in response to the weight of a falling book. When in the normal position illustrated, the gate 36 prevents pilfering.

While one retainer member 28 is operated to permit discharge of a book from a particular tray 22, a pusher means 40 (FIGURES 5, 6 and 7), associated with a shelf 12, operates to introduce another book into the tray 22 which has delivered a book. Accordingly a tray 22 which has delivered a book receives a new book in the vend cycle for a succeeding vend.

Figure 7:
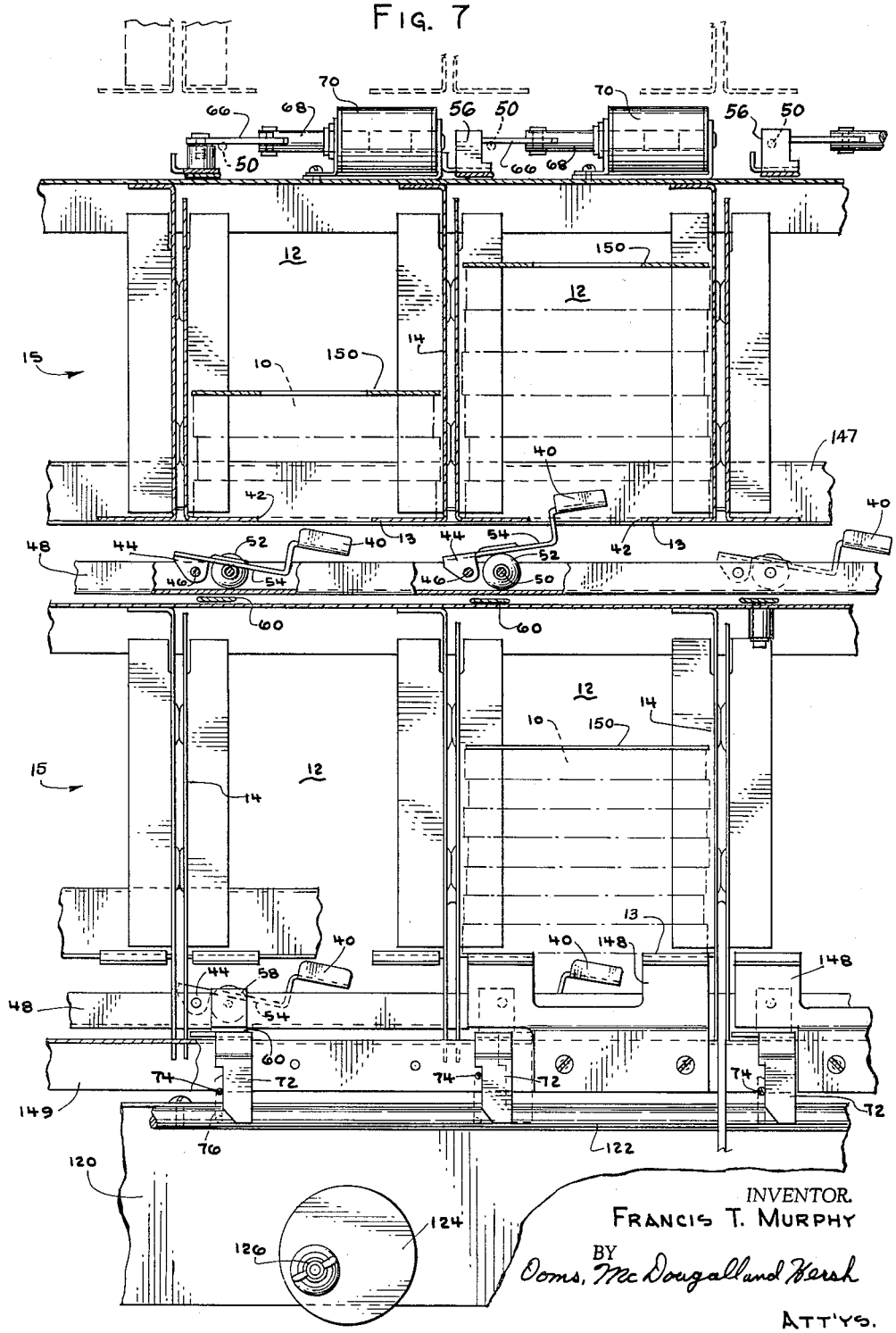
FIGURE 7 is a fragmenutary sectional front elevation illustrating the pusher mechanism and article selecting means which cooperate therewith.

As best shown in FIGURE 7, the pusher means 40, which is actuated, is adapted to move up behind the lowermost book in a stack. The pusher is caused to move forwardly and thereby push the lowermost book onto the tray 22. The retainer 28 has, in the meantime, moved back to the stop position and, therefore, the book is held on the tray until the next vend at this position is carried out.

*Detailed Description of Machine*

As noted, a plurality of shelf compartments 12 are located in each tier 15. The bottom portion 13 of the compartments is provided with an open center 42 so that the pusher 40 can traverse the shelf compartment when in the upward, or actuated, position.

The pushers 40 comprise inverted U-shaped sections 44 which are pivotally connected at 46 to an elongated channel member 48. Pins 50 are reciprocally positioned in the member 48 at a point next to the connection 46. Cone-shaped cam members 52 are fixed to the pins 50 and are adapted to move to forward and rearward positions relative to the channel member 48. Between the pushers 40 and the sections 44, there are provided flat portions 54. As one of the cams 52 moves relative to a channel member 48, the flat portion 54 associated with this cam is adapted to ride up and down on the tapered face of the cam. Accordingly, movement of the cam to a forward position to the right of FIGURE 5 will cause the pusher 40 to be located in the raised, or actuated, position. Location of the cams in the rearward position results in provision of the pushers in a lowered position.

Figure 5:
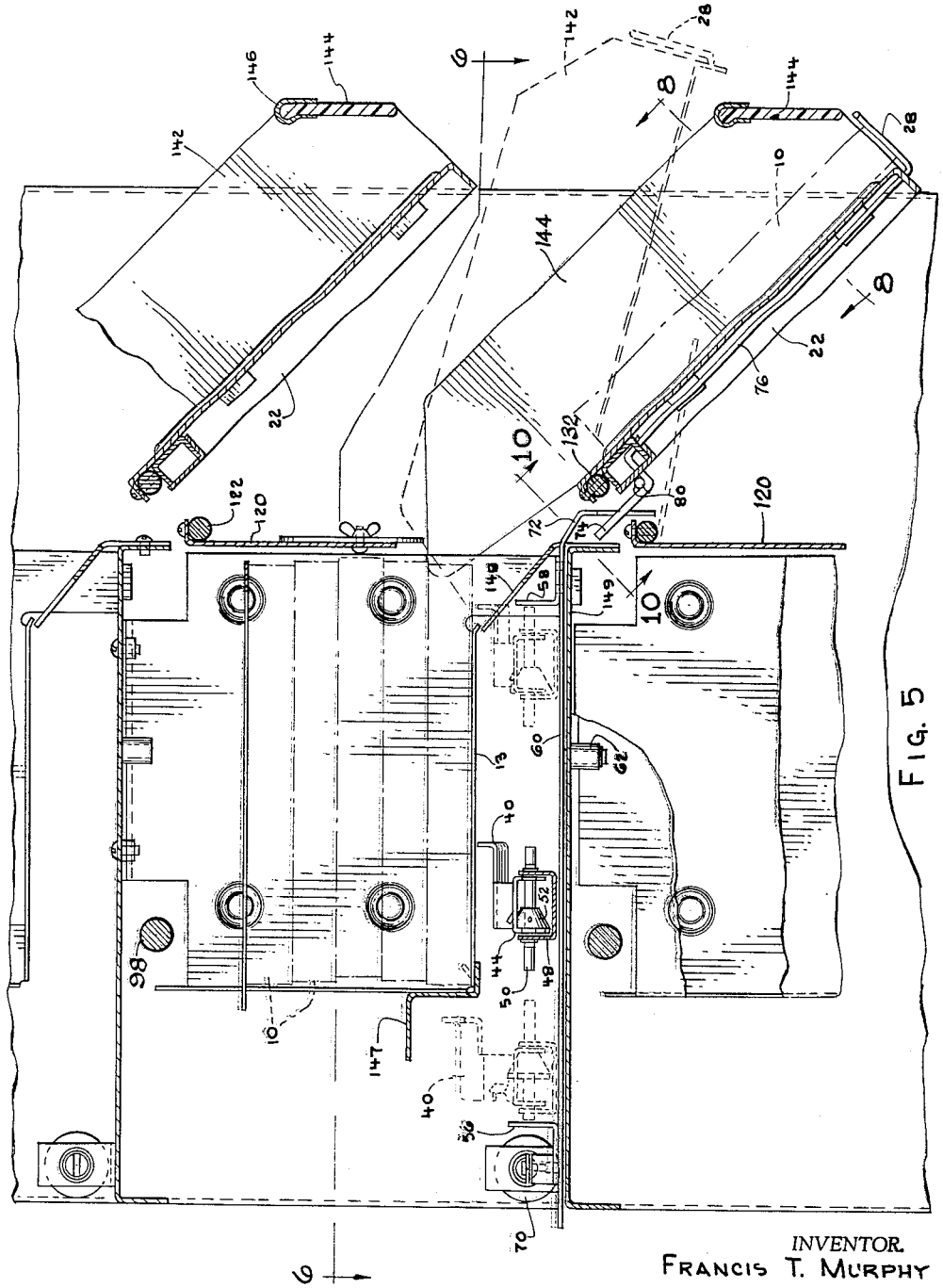
FIGURE 5 is a fragmentary sectional elevation illustrating portions of the pusher mechanism and vend chute.
Figure 6:
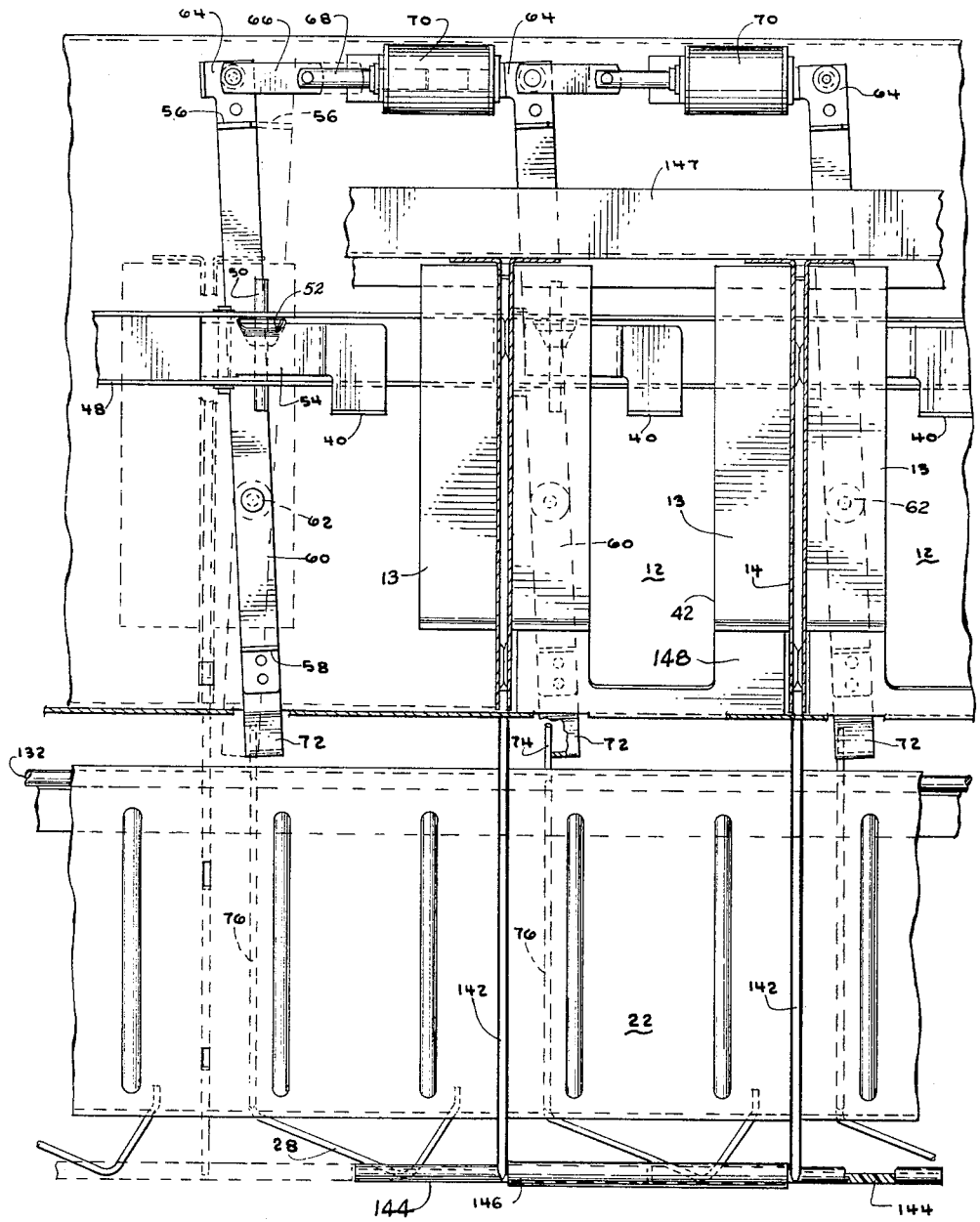
FIGURE 6 is a fragmentary sectional rear elevation taken about the line 6—6 of FIGURE 5.

The means which provide for movement of the pins 50 and, therefore, of the cams 52 relative to a channel member 48 are best illustrated in FIGURES 5 and 6. These means include a first stop member 56 located behind shelf compartments 12. If a member 56 is in the dotted line position shown at the upper left of FIGURE 6, a pin 50 will abut this member when the channel member 48 is moved to the rear of the machine housing. Continued movement of the channel member 48 will cause relative movement of a pin 50 and, therefore, the portion 54 associated with the pusher 40 will ride up on the cam 52. The pusher 40 will then be in the actuated position as shown at the left in FIGURE 5.

Movement of a channel member 48 to the front part of the machine housing will cause the lowering of an actuated pusher member 40. This results since the forwardly extending pin 50 of an actuated member 40 will be caused to abut a second stop member 58. This results in pushing of the pin 50 to the position shown at the right of FIGURE 5, and the pusher will be lowered as it rides down the cam 52.

The stop members 56 and 58 comprise upstanding portions formed in bars 60 which are pivotally connected to the machine frame at 62. At the rearward ends 64 of the bars, there are provided links 66 which connect the bars to extensions 68 of the cores of solenoids 70. Energization of one of these solenoids pulls the associated end 64 of a bar toward the solenoid. Accordingly, the stop 56 on that particular bar is moved into position to abut a pin 50.

The bars 60 are each provided with a downwardly extending flange 72 at their forward ends. The flanges 72 engage arms 74 of wires 76. These wires terminate at the ends of the trays 22 and the retainers 28 are a continuation of these wires.

Attached to each arm 74 at 78 is a spring 80, the other end of the spring being secured to the underside of tray 22 (see FIGURE 10). These springs normally hold the retainers 28 in a blocking position. However, when a solenoid 70 is energized, the flange 72 of a bar 60 associated with this solenoid will engage arm 74 and rotate the wire 76 in opposition to the spring 80. This rotation of the wire 76 moves the retainer 28 out of blocking position thereby clearing the end of a tray 22.

As previously noted, the channel members 48 are elongated and one of these members is provided for each tier within the machine. The members 48 extend completely across the machine and each of these members serves to simultaneously move each pin 50 and cam 52 located in a given tier. Similarly, mechanisms are provided for simultaneously moving each of the members 48 and, therefore, every pin 50 and cam 52 within the machine moves during each vend cycle.

Figure 3:
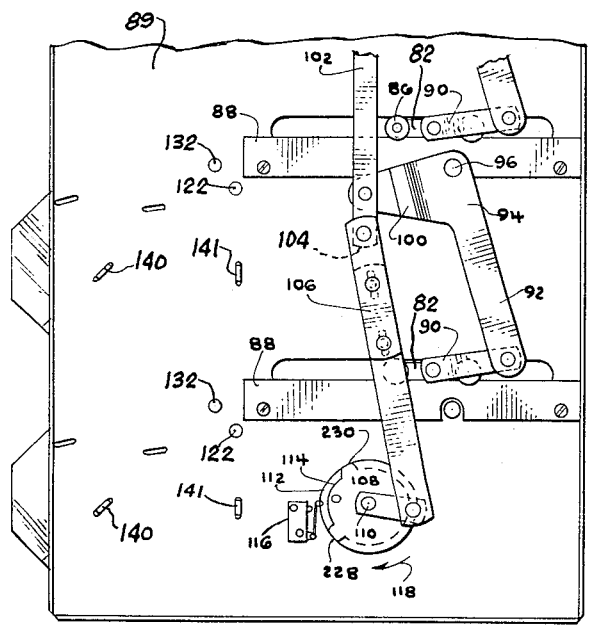
FIGURE 3 is a fragmentary sectional elevation illustrating a portion of the drive mechanism for pushers used in dispensing articles from the machine.
Figure 4:
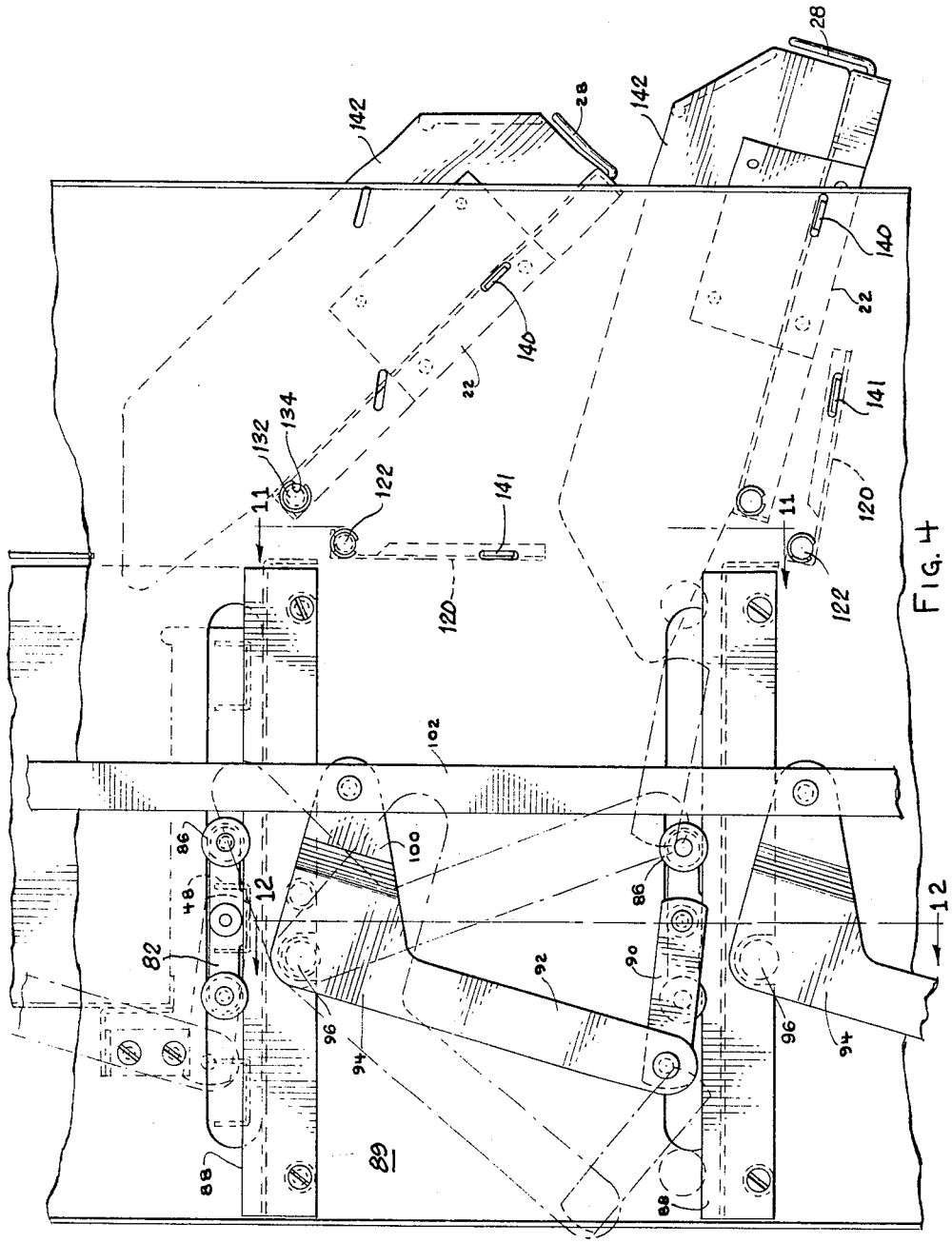
FIGURE 4 is a fragmentary sectional elevation illustrating portions of the drive mechanism and vending chute.
Figure 12:
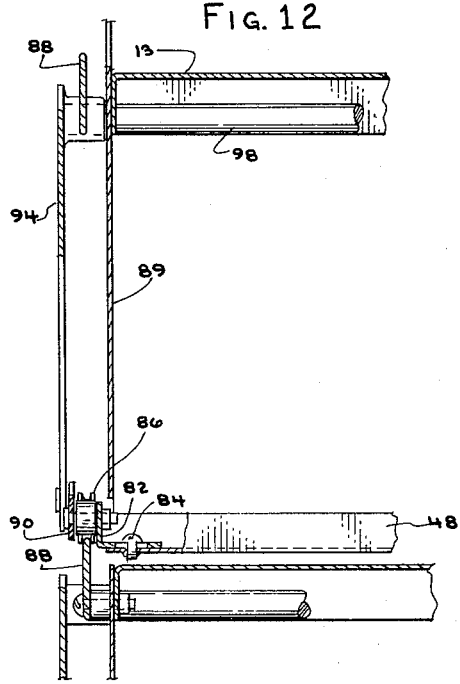
FIGURE 12 is a detail fragmentary view taken about the line 12—12 of FIGURE 4.

The mechanisms which move the channels 48 are best shown in FIGURES 3, 4 and 12. Each of the channels is provided with a carriage 82 secured thereto by means of screws 84. The carriages are provided with wheels 86 riding on tracks 88. The tracks are located on the outside of end plates 89 of the machine.

Links 90 are connected at one end of the carriages 82 and the other ends thereof are connected to arms 92 of cranks 94. The cranks are secured at 96 to hinge bars 98. The other arms 100 of the cranks are connected to an actuating bar 102. The bottom end 104 of the actuating bar is connected by means of a link 106 to member 108. This member 108 is fastened to the drive shaft 110 of motor 112. A cam element 114 is also connected to the drive shaft and is operatively associated with motor control switches 116.

Operation of the motor 112 results in rotation of the shaft 110 in the direction of arrow 118. This pulls the bar 102 downwardly. This causes movement of the carriages 82 and, accordingly, channel members 48, to the rearward position. Continued operation of the motor results in movement of the bar 102 upwardly, serving to move the carriages 82 to the forward position. In the latter stages of movement of the motor, the carriage 82 is returned to an intermediate location and remains there until initiation of the next vend cycle.

Hinge bars 98, which are fastened to the cranks 94, preferably extend through the machine housing to similar cranks on the opposite side of the machine. These cranks are tied to carriages 82 which carry the opposite ends of the channel members 48. Accordingly, synchronized movement of the members 48 is achieved, serving to avoid binding within the apparatus.

Several other features are incorporated in the illustrated vending machine. Plates 120, suspended on rods 122, are provided in the front of the stacks of books in each tier. Adjustable means are secured to these plates in order to prevent the passage of more than one book from a stack at a given time. One such means comprises a disc 124, illustrated in FIGURE 7. The disc is secured by means of wing nut 126 to the plate 120, and it will be apparent that due to the off-center mounting of the disc, rotation of the disc will result in variations in clearance with respect to the floor 13 of the book compartments.

Figure 11:
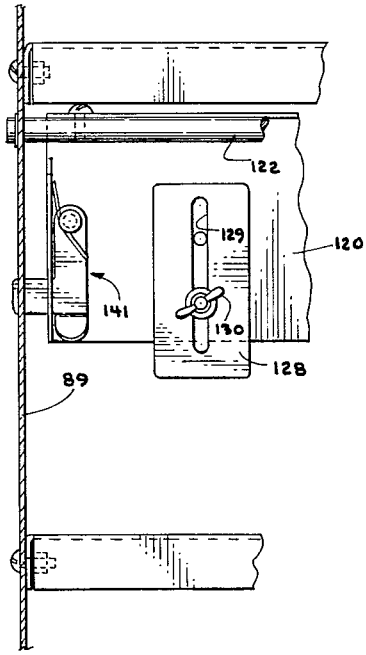
FIGURE 11 is a detail fragmentary view taken about the line 11—11 of FIGURE 4.

An alternative form of plate is shown in FIGURE 11. This plate 128 can be located in various positions relative to the slot 129 by means of the wing nut 130. Obviously, variations in clearance between this plate and the floor of the book compartment can thus be achieved.

A row of trays 22 can be swung to the dotted line position shown in FIGURE 5 in order to provide for loading and unloading of the book compartments. The trays are secured to rods 132, which are journaled at 134 to the end plates 89 of the housing. The trays can be releasably fastened in the operating position by means of the latch shown in FIGURE 9. The latch comprises a handle portion 136 which permits movement of the latch to the dotted line position illustrated. The tongue 140 of the latch is normally received in a notch formed in the end plate 89, and the resilient mounting 138 urges the tongue into the notch. As shown in FIGURE 5, the plates 120 can also be swung upwardly to permit access to the book compartments. A latch arrangement 141, similar to that described, can be associated with the plates 120 (FIGURE 11).

Figure 15:
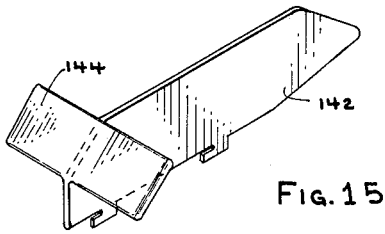
FIGURE 15 is a detail perspective view of a divider element employed in the vending machine.

The trays 22 are preferably provided with dividers 142 which maintain the books in proper alignment. The divider illustrated in FIGURE 15 includes wings 144 adapted to extend over adjoining tray segments. The books are adapted to pass beneath these wings when the retainer 28 is moved in the vend cycle. Stiffeners 146 connect adjoining wing portions and serve to hold the dividers in position. The dividers are preferably formed of a transparent material to provide maximum visibility for a purchaser.

Figure 13:
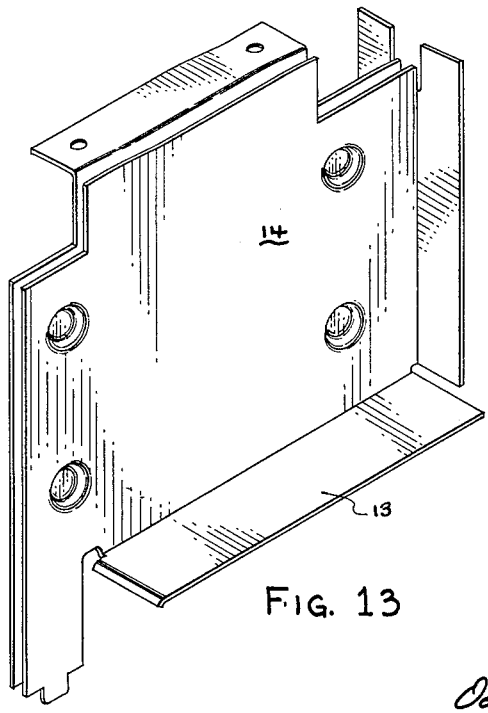
FIGURE 13 is a detail perspective view of a portion of the shelf structure employed in the vending machine.

FIGURE 13 illustrates the member which forms the bottom 13 and the upstanding walls 14 of a book compartment 12. The compartments are provided by spot welding the walls 14 back-to-back and then securing these members to the supports 147 and 149 provided within the machine housing (see FIGURE 5). Inclined members 148 are also secured to the support 149, and these members form forward extensions of the bottom 13.

Figure 14:
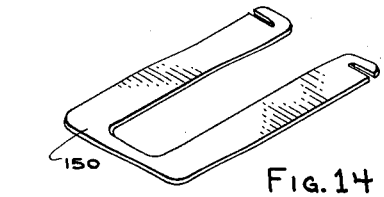
FIGURE 14 is a detail perspective view of a weight plate employed in the vending machine.

FIGURE 14 illustrates a weight plate 150 adapted to be placed on top of a stack of books. This plate keeps the stack in alignment and serves to avoid binding of a book within the compartment.

*Circuit Diagram*

FIGURE 16 illustrates a suitable circuit which can be employed in combination with the described vending machine. It will be appreciated that various equivalent circuitry, capable of providing for operation of the described mechanisms, is contemplated.

The circuit illustrated is designed to be employed in combination with any conventional coin accumulating system which can be adapted to complete a circuit upon accumulation of a predetermined amount of money. One conventional system contemplated includes the use of steppers which move in accordance with the number of monetary increments, such as 5¢ increments, which are recorded in the machine. In such systems, accumulation of an amount of money equal to or in excess of the price of the article selected will complete a circuit whereby a vending cycle can be initiated.

An A.C. source 160 is provided for the circuit shown. A master off-on switch 162 and a viewing light 164 are also included in this main circuit as well as a transformer 166. The secondary of the transformer provides the power for the vend circuit.

The vend circuit includes a credit accumulator 200 having a plurality of contacts located thereon. In a typical credit accumulator an amount of coins inserted in the machine will serve to bridge contacts therein, such as the contact 201 shown. A bridged contact will complete a circuit to the transformer, this circuit also including bridge contacts 204 and pushbutton switch 202. The contacts 204 are bridged due to positioning of the selector mechanism on the face of the machine and lines 205 tie the contacts 204 to particular ones of the contacts in the credit accumulator 200. Accordingly, a specific price can be associated with each position of the selector and the circuit through these contacts will not be completed until the price for this position is reached.

Completion of the circuit which comprises the bridged contacts and the pushbutton switch serves to energize relay 206. This relay operates to close switch 208 thereby completing its own holding circuit. The holding circuit includes normally closed cam controlled switch 210.

Relay 206 also operates to close switch 212. Closing of this switch energizes rectifier 214 and direct current is fed thereby to a locking solenoid 216. This solenoid serves to hold the selector 24 in the position selected by the purchaser until completion of the vend.

Positioning of the selector mechanism by the purchaser will also result in bridging of one set of contacts shown at 218 at the same time that one set of the contacts 204 are bridged. Obviously, several of the contacts 204 and 218 are provided, depending on the number of selections available, and each of the contacts 218 is included in a circuit which includes a solenoid 70. Accordingly, one of the solenoids 70 will be energized through operation of rectifier 214.

The relay 206 also closes a switch 218 thereby energizing coil 220. This coil is adapted to operate a credit unit for giving change and initiates collecting of the money in a conventional fashion.

The relay 206 also serves to close switch 222 which provides current to the coil 224. This coil represents the motor 112 and, therefore, energization of the relay 206 begins operation of this motor.

The motor control switches 116, shown in FIGURE 3, include the normally closed cam operated switch 210 and a normally open switch 226. As the motor 112 rotates in the direction of the arrow 118, a first nipple 228 on the cam 114 opens the switch 210 while simultaneously closing switch 226. Opening of the switch 210 breaks the holding circuit for the relay 206 thereby de-energizing this relay as well as de-energizing rectifier 214. Accordingly, the solenoid 70 which was energized will be deenergized when the nipple 228 opens the switch 210. However, the motor 112 will continue to operate, since closing of the switch 226 completes a holding circuit therefor. Continued operation of the motor eventually causes nipple 230 to close switch 210 and open switch 226. The motor will then stop and the machine will be set for the next vend cycle.

It will be appreciated when considering the described operation that the use of a conventional credit accumulating mechanism will provide for energization of a single solenoid 70 associated with the particular book desired. Energization of this solenoid will result in pulling in of the end 64 of a pivotal bar 60. Accordingly, the flange of the bar will cause rotation of wire 76, downward movement of recliner 28 and consequent clearing of the tray 22 corresponding to this book position. Thus, a book is vended as soon as the proper amount of money for the particular selected position has been deposited.

When the solenoid 70 is energized, the motor 112 will at the same time begin operation. As described, the initial movement of the motor 112 carries the channel members 48 and the associated pushers 40 to a rearward position. Since the stop member 56, associated with the one energized solenoid, will be in the path of a pin 50, the pusher 40 at this position will be raised. As the motor continues to operate, the channel members 48 are carried forwardly and the pusher will move the lowermost book in a compartment 12 onto a tray 22.

The retainer 28 must be returned to the blocking position before a pusher 40 has moved a book onto the tray. This is accomplished since the nipple 228 has operated to de-energize a solenoid 70 before the pusher 40 has moved a book out of a compartment 12. The pusher 40 which is raised returns to its lowered position since the pin 50 associated with this pusher will strike stop member 58 near the end of the forward movement of the channels 48. Continued operation of the motor 112 returns the channel members 48 to the intermediate rest position before nipple 230 causes stopping of the motor.

The vending machine described is capable of handling large numbers of books or other articles since there is no theoretical limitation on the number of tiers which can be used, the number of shelves in a tier or the number of books on a shelf. The mechanisms which provide for vending of a book accomplish this vending in an extremely rapid fashion. Furthermore, positioning of another book for a succeeding vend in the position previously vacated is accomplished by means of relatively simple mechanical methods. The described apparatus is also highly practical in that the books positioned for a vend can be easily seen from outside the machine.

It will be appreciated that various mechanical and electrical means which are equivalent to those described can be included in this apparatus. It will also be understood that many modifications can be made in the vending machine which provide the characteristics of this invention without departing from the spirit thereof, particularly as defined in the following claims.

I claim:

1. A vending machine comprising a plurality of compartments for storing articles to be vended, inclined trays positioned adjacent the floors of said compartments and extending downwardly and outwardly therefrom, retaining means provided adjacent each of said trays for holding articles thereon, vend initiating means, including means operatively connected to said retaining means and selectively actuatable for moving said retaining means to release articles from said trays; article-engaging means provided for each of said compartments and having operative and inoperative positions, means operatively associated with said vend initiating means including means selectively positioned thereby for interfering engagement with said article-engaging means when the latter are appropriately driven to sequentially actuate the same to operative and inoperative positions during the initial and final stages, respectively, of a vend cycle; means for driving said article-engaging means toward and away from said means positioned for engaging the same, each said article-engaging means when actuated to operative position being adapted to subsequently engage articles in an associated one of said compartments and to deposit the same on an associated one of said trays, and means for restoring said retaining means to article-holding position after release of articles from said trays and before the deposit of additional articles therein.

2. A vending machine according to claim 1 wherein said vend initiating means comprise selectively actuatable electro-responsive means for each of said compartments, and wherein movement of the retaining means is effected in response to operation of the said means positioned by said vend initiating means for sequentially actuating said article engaging means to operative and inoperative positions whereby only those trays which release an article are provided with a new article by said article engaging means.

3. In a vending machine of the type including a selector means adapted to be operated by an individual, a plurality of article holding compartments each corresponding to a position on said selector means, a series of first contacts one of which is bridged depending on the position of said selector means, means for receiving money in said machine, a series of second contacts associated with said money receiving means, means operating in response to the amount of money received for bridging one of said second contacts, and a plurality of circuits electrically connecting specific ones of said first and second contacts, the improvement comprising a plurality of electro-responsive means associated one with each of said compartments, means for selectively energizing one of said electro-responsive means when one of said circuits is completed, inclined trays positioned adjacent the floors of said compartments and extending downwardly and outwardly therefrom, plural retaining means provided one for each of said trays for holding said articles thereon, each said electro-responsive means when energized being operative to move an associated one of said retaining means to permit release of articles from one of said trays, plural article engaging means associated one with each of said compartments and having a normally inoperative position, means operatively associated with each of said electro-responsive means and selectively positioned thereby for interferingly engaging an associated one of said article engaging means to actuate the same to operative position when an associated one of said electro-responsive means is energized, means responsive to completion of one of said circuits for driving all said engaging means toward said means for actuating the same to operative position and thereafter toward each said trays, said engaging means when actuated to operative position being adapted to engage articles in the compartment associated therewith and deposit the same in a tray, and means for restoring said retaining means for this tray to the article holding position after articles are released therefrom and before an associated said engaging means moves additional articles into this tray.

4. A vending machine comprising a plurality of compartments for holding articles to be vended, inclined trays positioned adjacent the floors of said compartments and extending downwardly and outwardly therefrom, retaining means provided for each of said trays for holding one of said articles thereon, extension means on said retaining means terminating adjacent the front of said compartments, selectively operable electro-responsive means associated with each of said compartments, plural actuating bars each having one end connected to one of said electro-responsive means and the other end thereof engaging an associated one of said extension means whereby energization of each of said electro responsive means results in movement of one retaining means from an article holding position to a tray clearing position for vending an article, pusher means associated with each compartment and having an operative and an inoperative position, spaced means on said bars, selectively positioned thereby, for sequentially engaging said pusher means when the latter are driven thereagainst and when an associated electro-responsive means is energized and de-energized, one of said spaced means being adapted to move the pusher means to operative position and the other thereof being adapted to move the same to inoperative position, means for driving said pusher means sequentially into engagement with said spaced means and for contacting an operatively positioned pusher means with articles in one of said compartments to remove individual articles therefrom and deposit articles in an associated one of said trays, and means cooperating with said bars for restoring said retaining means to article holding position after release of an article from said trays and before said pusher means deposit additional articles into said trays.

5. A vending machine according to claim 4 wherein said retaining means comprise elongated wire members mounted for rotational movement about the longitudinal axis thereof beneath said trays, an upstanding portion formed in each of said members, means normally rotating said members in one direction for urging said upstanding portions thereof above the floor of said trays thereby blocking the ends of the trays, said bars being adapted to cause periodic rotation of said members whereby the upstanding portions thereof are swung downwardly to clear the ends of said trays when an associated one of said electro-responsive means is energized.

6. A vending machine according to claim 4 wherein said electro-responsive means comprise solenoids with horizontally extending cores, said actuating bars being pivotally mounted intermediate their ends and being connected to extensions of said cores whereby energization of said solenoids will pivot said bars in a horizontal plane bringing said one of said spaced means into position for engagement with said pusher means and simultaneously causing movement of said retaining means from the article holding position to the tray clearing position.

7. A vending machine according to claim 4 wherein said pusher means include upstanding article engaging portions at one end, pivotal connections at the other end and an intermediate reciprocal cam engagement surface, cam elements associated with the means for driving said pusher means, means connected to said cam elements for one of said spaced means on the bars when said electro-responsive means are energized and said pusher means is driven thereagainst, this engagement resulting in movement of said cam elements over said cam engaging surfaces whereby said pusher means pivot about said connection and said article engaging portions are raised to said operative position.

8. In a vending machine of the type including a selector means adapted to be operated to plural positions by an individual, a plurality of article holding compartments each corresponding to a position on said selector means, a series of first contacts one of which is bridged depending on the position of said selector means, means for receiving money in said machine, a series of second contacts associated with said money receiving means, means for bridging certain of said second contacts accordingly to the reception of money, and a plurality of circuits electrically connecting specific ones of said first and second contacts, the improvement comprising electro-responsive means associated with each of said compartments, means for selectively energizing one of said electro-responsive means when one of said circuits is completed, inclined trays positioned adjacent the floors of each of said compartments and extending downwardly and outwardly therefrom, retaining means provided for each of said trays for holding one of said articles thereon, extension means on said retaining means terminating adjacent the front of each of said compartments, pivotal actuating bars each having connection with one of said electro-responsive means and one of said extension means whereby energization of any one of said electro-responsive means results in pivotal actuation of an associated one of said bars and responsive movement of the associated retaining means from an article holding position to a tray clearing position for vending an article, plural pusher means associated one with each compartment and adapted to be moved into operative and inoperative positions, means on each of said bars conditioned for engaging an associated said pusher means when an associated said electro-responsive means is energized, means for driving said pusher means for bringing them into engagement with the said conditioned means on the bars to move said pusher means to operative position, said driving means also being adapted to move an operatively positioned pusher means into contact with articles in an associated one of said compartments, each said operative pusher means being adapted to deposit one article from a compartment onto an associated tray, said electro-responsive means and associated bar being operative to restore said pusher means to inoperative position and also to restore said retaining means to the article holding position after release of an article from a tray.

9. A vending machine comprising a housing having a plurality of tiers located therein, a plurality of compartments for holding articles to be vended arranged in side-by-side relationship in each of said tiers, said compartments including upstanding side walls and a bottom wall defining an elongated central opening, inclined trays positioned adjacent the bottom walls of said compartments and extending outwardly and downwardly therefrom, retaining means provided for each of said trays for holding one of said articles thereon, vend initiating means operatively connected to said retaining means for moving said retaining means for releasing articles from said trays, article engaging means having a normally inoperative position and adapted to be actuated into an operative position, said engaging means extending into said central opening when in the operative position, spaced means selectively positioned by said vend initiating means for causing said engaging means to be moved sequentially to operative and inoperative positions, means for reciprocally driving said engaging means beneath said compartments and toward said trays, said engaging means when in the operative position being adapted to engage the lowermost of the articles in said compartments and deposit the same in said trays, and means for restoring said retaining means to the article holding position after release of articles from a tray and before said engaging means deposit additional articles therein.

10. A vending machine according to claim 9 wherein one of said spaced means is located at the ends of said compartments adjacent said trays for restoring operative engaging means to an inoperative position.

11. A vending machine according to claim 10 wherein the means for driving said engaging means comprise elongated members extending across each of the tiers in said machine and motor means operatively connected to said elongated members, the driving means operating to simultaneously reciprocate all of said engaging means during each vending cycle of the machine.

12. A vending machine comprising a housing having a plurality of tiers located therein, a plurality of compartments for holding articles to be vended arranged in side-by-side relationship in each of said tiers, said compartments including upstanding side walls and a bottom wall defining an elongated central opening, inclined trays positioned adjacent the bottom walls of said compartments and extending downwardly and outwardly therefrom, retaining means provided for each of said trays for holding one of said articles thereon, extension means on said retaining means terminating adjacent the front of said compartments, single electro-responsive means associated with each of said compartments, elongated pivotal actuating bars for each compartment having one end connected to said electro-responsive means and the other end engaging said extension means whereby energization of one of said electro-responsive means results in pivoting an associated one of said bars and responsive movement of the retaining means from said holding position to a tray clearing position for vending an article therefrom, pusher means associated with each compartment and having an operative and an inoperative position, the operative position of said pusher means resulting in movement of the pusher means above the plane of said bottom wall and opposite said central opening, means on said bars for interferingly engaging said pusher means when the latter are driven thereagainst and when said electro-responsive means are energized whereby the pusher means are moved to said operative position, driving means for said pusher means comprising elongated members extending through the machine housing, one of said elongated members being provided in each tier and each pusher means in a tier being connected to these members, motor means adapted to simultaneously reciprocate said elongated members and associated pusher means beneath said compartments during each vend cycle of the machine, this movement of the pusher means bringing the pusher means into operative position when engaged by said means on the bars and providing for contact of operatively positioned pusher means with the lowermost articles in said compartments, said operatively positioned pusher means being adapted to deposit articles on said trays, and means for restoring the retaining means to the article holding position after release of articles by the trays and before said pusher means deposit additional articles on said trays.

13. A vending machine according to claim 12 wherein said retaining means comprise elongated wire members mounted for rotational movement beneath said trays, an upstanding portion formed in each of said wire members, means normally urging said upstanding portions above the floors of said trays thereby blocking the lower end of the trays, said other ends of said bars comprising crank arms adapted to cause rotation of said wire members about their longitudinal axes whereby the upstanding portions thereof are swung downwardly to clear the ends of said trays.

14. A vending machine according to claim 12 wherein said electro-responsive means comprise solenoids with horizontally extending cores, said actuating bars being pivotally connected to said housing intermediate their ends and being connected to extensions of said cores, energization of each of said solenoids serving to pivot one of said bars in a horizontal plane whereby the said means on the bars are moved into position for engagement with said pusher means and whereby said retaining means are moved from holding position to tray clearing position.

15. A vending machine according to claim 12 wherein said pusher means comprise upstanding article engaging portions at one end, means pivotally connecting the other ends thereof to said elongated members, a cam engaging surface formed in said pusher means intermediate said ends, cam elements reciprocally mounted within said elongated members, means connected to said cam elements for engagement with said means on the bars when said electro-responsive means are energized, this engagement resulting in rectilinear movement of said cam elements relative to said cam engaging surfaces whereby said pusher means pivot at said connection and whereby said article engaging portions are raised to said operative position.

16. A vending machine according to claim 15 wherein said elongated members are channel-shaped, said means connected to said cam elements comprising pins extending from either side of the cams beyond the channel walls, said pins being movable with respect to said walls, said means on the bars comprising upstanding stop means adapted to be located in the path of one end of the pins whereby the pins are adapted to engage said stop means and move uni-directionally relative to said walls, and including second stop means located on the opposite ends of said bars for engaging the other end of said pins and moving the same in an opposite direction whereby cam elements associated with operative pusher means are moved to return such pusher means to inoperative position.

References Cited in the file of this patent
UNITED STATES PATENTS

| | | |
|---|---|---|
| 1,123,075 | Blythe | Dec. 29, 1914 |
| 2,455,976 | Caruso | Dec. 14, 1948 |
| 2,834,512 | Fry | May 13, 1958 |
| 2,955,924 | Chanko | Oct. 11, 1960 |
| 3,000,539 | Danziger et al. | Sept. 19, 1961 |
| 3,055,545 | Genser et al. | Sept. 25, 1962 |